(12) United States Patent
Thomason

(10) Patent No.: US 7,015,924 B2
(45) Date of Patent: Mar. 21, 2006

(54) DISPLAY APPARATUS AND IMAGE ENCODED FOR DISPLAY BY SUCH AN APPARATUS

(75) Inventor: Graham G. Thomason, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 334 days.

(21) Appl. No.: 10/106,947

(22) Filed: Mar. 26, 2002

(65) Prior Publication Data

US 2002/0154142 A1  Oct. 24, 2002

(30) Foreign Application Priority Data

Apr. 20, 2001  (GB) .................................. 0109720

(51) Int. Cl.
G09G 5/00 (2006.01)

(52) U.S. Cl. .................................... 345/582

(58) Field of Classification Search ............... 345/581, 345/582, 419, 420, 421, 592, 629
See application file for complete search history.

(56) References Cited

U.S. PATENT DOCUMENTS

| | | | | |
|---|---|---|---|---|
| 4,984,157 A | * | 1/1991 | Cline et al. .................. | 345/424 |
| 5,335,318 A | * | 8/1994 | Kirk ........................... | 345/639 |
| 5,363,475 A | * | 11/1994 | Baker et al. ................. | 345/422 |
| 5,463,728 A | | 10/1995 | Blahut et al. ................ | 395/158 |
| 5,480,305 A | | 1/1996 | Montag et al. ................ | 434/2 |
| 5,710,876 A | * | 1/1998 | Peercy et al. ................ | 345/426 |
| 5,831,620 A | * | 11/1998 | Kichury, Jr. ................. | 345/419 |
| 5,896,131 A | | 4/1999 | Alexander .................... | 345/340 |
| 6,034,691 A | * | 3/2000 | Aono et al. .................. | 345/582 |
| 6,037,914 A | | 3/2000 | Robinson | |
| 6,088,018 A | | 7/2000 | DeLeeuw et al. ............. | 345/156 |
| 6,118,453 A | * | 9/2000 | Suzuki et al. ................ | 345/426 |
| 6,157,415 A | * | 12/2000 | Glen ........................... | 348/599 |
| 6,177,034 B1 | * | 1/2001 | Ferrone ....................... | 264/40.1 |
| 6,181,384 B1 | * | 1/2001 | Kurashige et al. ........... | 348/577 |
| 6,353,450 B1 | * | 3/2002 | DeLeeuw ..................... | 715/768 |
| 6,452,593 B1 | * | 9/2002 | Challener .................... | 345/419 |
| 6,697,062 B1 | * | 2/2004 | Cabral et al. ................ | 345/419 |
| 2002/0080136 A1 | * | 6/2002 | Kouadio ...................... | 345/426 |

OTHER PUBLICATIONS

J.D. Foley et al., "Computer Graphics: Principles and Practise" ISBN 0-201-12110-7, pp. 8-17.

* cited by examiner

Primary Examiner—Ryan Yang

(57) ABSTRACT

In a system for storing and displaying images, such as in a personal computer or mobile telephone, a display apparatus is provided which selectively displays virtual reflections of the real environment according to mirror values encoded with the stored image. A camera (302) provides real-time environmental image data which, under control of the CPU (100), are stored in memory (106, VRAM3). For transparency effects, background image data (RGB2) are mixed (110) with the foreground image (RGB1) under control of a transparency code (T). The resultant pixel values (RGB3) are further mixed with the environmental image data read out of VRAM3 which are left-right reversed (118) to simulate a true mirror image ) for output to the display device (300). The image from another camera (310) can be used in the same manner to provide a virtual transparency function. By controlling the transparency and reflection effects for each pixel of the image, various special effects and a more realistic display can be achieved.

13 Claims, 2 Drawing Sheets

DISPLAY APPARATUS AND IMAGE ENCODED FOR DISPLAY BY SUCH AN APPARATUS

The invention relates to the storage and display of images, particularly in digital form, in apparatus such as a personal computer, personal digital assistant or mobile telephone. The invention further relates to storage of images in a novel format adapted for use with such apparatus.

Computer display apparatuses are very widespread in modern life, whether in the field of work, information or entertainment. Most image formats, such as the bitmap format, provide for three colour co-ordinates: Red Green and Blue (RGB). From these all other colours are made. Each pixel (or sometimes a group of pixels) of the image is defined in terms of red, green and blue intensity. If eight bits are used per colour co-ordinate per pixel, then $2^{24}$ (=16 million) colours can be defined. Various other colour co-ordinate schemes such as HSV (hue, saturation, value) and YUV (an intensity and colour difference scheme used for TV broadcasts) can be mapped to or from RGB, and are in principle equivalent. Certain formats have advantages for television transmission, others for image transformation, and others match well to human vision sensitivity by providing finer colour resolution where it is needed.

Compression schemes also exist. They may be lossless or lossy. When the image is decompressed, it is represented by RGB values per pixel, or an equivalent. More advanced schemes encode texture. Ultimately, though, the decoded picture contains RGB values per pixel.

An additional useful feature is to be able to specify that a part of an image is to be regarded as "transparent". This means that if the image is displayed where there are other images on a logical z-axis, the underlying image(s) are to be displayed. Example of such systems are described for example in U.S. Pat. No. 5,463,728 (Blahut/AT&T), and U.S. Pat. No. 5,896,131 (Alexander/HP). Transparency can apply through many images. U.S. Pat. No. 5,480,305 (Montag/Southwest) describes transparency as an attribute of simulated three dimensional (3-D) "weather elements" such as cloud and rain objects, for simulating weather conditions.

If a pixel is defined to be transparent in all superimposed images at the position of any pixel, the final physical display does not (normally) render transparency; some RGB value is delivered to the device. The value is typically "black" or "white" or some "background colour". Transparency can be regarded as a pseudo-colour. It is supported by "gif" files.

The invention aims to increase the variety of effects that can be achieved through present day display devices, and also to propose novel properties of display device. Broadly speaking, the invention adds another pseudo-colour possibility, which will be referred to as the mirror code. This does not mean that some part of the image is to be "flipped horizontally", although a bit could be set for that purpose. It means that (parts of) the presented image should effectively be like a physical mirror, as if the pixels were silvered, displaying on a screen to the operator what appears to be a reflection of a real, physical environment in which the display apparatus resides. It is noted at this point that U.S. Pat. No. 6,088,018 (DeLeeuw/Intel) proposes a user input device for a computer terminal, which blends a mirror image of the user with the normal "desktop" display, so that the user can by hand movements virtually "grab" icons and the like to interact with the system. The mirror image extends uniformly over the entire display for this purpose, and is derived from a forward-looking (that is, imaging the environment in front of the display apparatus) camera sited above the screen. Camera input is also provided of course for modern applications such as videoconferencing.

According to the present invention there is provided a display apparatus comprising a display device and means for storing an image in the form of digital data, the digital image data being stored in a format defining colour values and additionally mirror values for different parts of the stored image, and means for controlling the display device so as to display reflections of the real environment selectively according to the mirror value at each part of the stored image.

The rendering of the reflections may be by physical rendering of a silver-like effect, under control of the mirror values. Alternatively, the rendering of the reflections may be by merging colours defined by the colour values with information received in real time from a camera associated with the display device, wherein the merging may be implemented to a variable degree, in accordance with a range of possible mirror values stored within the image data format. A part of the range of the mirror values may be reserved to indicate normal mirror rendering or left-right inversion corrected rendering, and the reflections rendered accordingly. The colour values and mirror values may be stored for each pixel or group of pixels within a raster-based image.

The means for controlling the display may be arranged to apply geometric transformations on the image data derived from the camera, in addition to left-right inversion, to correct for displacement of the camera relative to a notional reflective point on the screen of the display device.

The image data format may further specify a variable mirror orientation, the reflections being rendered so as to reflect a different part of the real environment, depending on the specified mirror orientation. The mirror orientation may be specified in the form of two angles with respect to the plane of the display.

According to the present invention there is also provided a hard copy printing device compatible with the display apparatus, the printer being arranged to deposit coloured and mirror-like materials onto a recording medium selectively according to the colour and mirror values at each part of a stored image.

According to an independent aspect of the present invention there is also provided a display apparatus comprising a display device and means for storing an image in the form of digital data, the digital image data being stored in a format defining colour values and additionally transparency values for different parts of the stored image, and means for controlling the display device so as to display portions of the real environment selectively according to the transparency value at each part of the stored image. The invention is accordingly not limited to just mirror reflection effects, but also real or "virtual" transparency, as opposed to conventional transparency between planes in a two dimensional (2-D) display.

The rendering of the portions may be by physical transparency, under control of the transparency values. Alternatively, the rendering of the portions may be by merging colours defined by the colour values with information received in real time from a camera associated with the display device.

The image data format may further specify a variable transparency orientation, the transparency being rendered so as to refract a different part of the real environment, depending on the specified transparency orientation. The transparency orientation may be specified in the form of two angles with respect to the plane of the display.

According to the present invention there is also provided an image storage device wherein there is stored image data in a format including colour and mirror values compatible with a display apparatus.

Embodiments of the invention will now be described, by way of example only, by reference to the accompanying drawings, in which:

FIG. 6 shows schematically the structure and functioning of a third specific embodiment, in which a display monitor has a mirror effect built-in.

Figure 1:
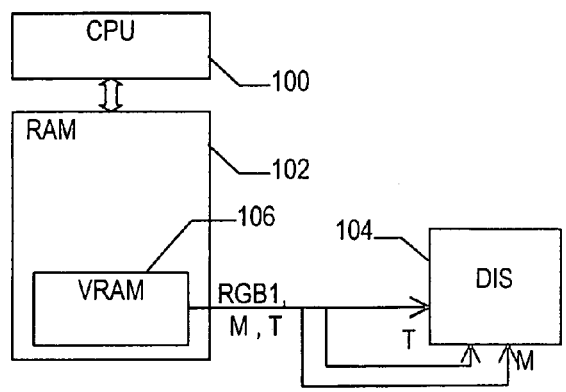
FIG. 1 shows schematically the main elements of a display apparatus embodying the present invention.

FIG. 1 shows in schematic form a computer-based display apparatus. The main components for the purpose of the present description are a central processor (CPU) 100, memory (RAM) 102 and a display device (DIS) 104. The skilled person would appreciate that, in a typical system, a great many additional components including power supply, input devices (keyboard, mouse, etc.) and mass storage devices would be provided. These are of conventional form, and need not be described for an understanding of the present invention.

Within memory 102, a fixed or variable portion 106 (hereafter referred to as image memory) is provided for the storage of digitised images, which may be still or motion picture images. These images can be synthesised, or retrieved from storage devices such as magnetic or optical discs (CD ROM), or received via network services. In the present example, the image memory 106 is organised on a bit-mapped (raster) basis, with red, green and blue colour component values being stored for every pixel. The invention is not limited to bit-mapped storage of images, nor to the specific RGB representation used in the present example. Other colour co-ordinate systems such as YUV are well known in the art. High level or "object-based" representation of images may be stored in image memory 106 and converted to raster format during read out for the display device 104.

As illustrated, the stored image in the present case includes RGB values labelled RGB1, but also separate codes T and M defining a degree of transparency and reflectivity for each part of the stored image. It is a matter of design choice, whether the codes T and M represent just two levels of transparency or reflectivity (one bit values), or whether a large number of degrees of reflectivity and transparency can be represented (multi-bit values).

Figure 2:
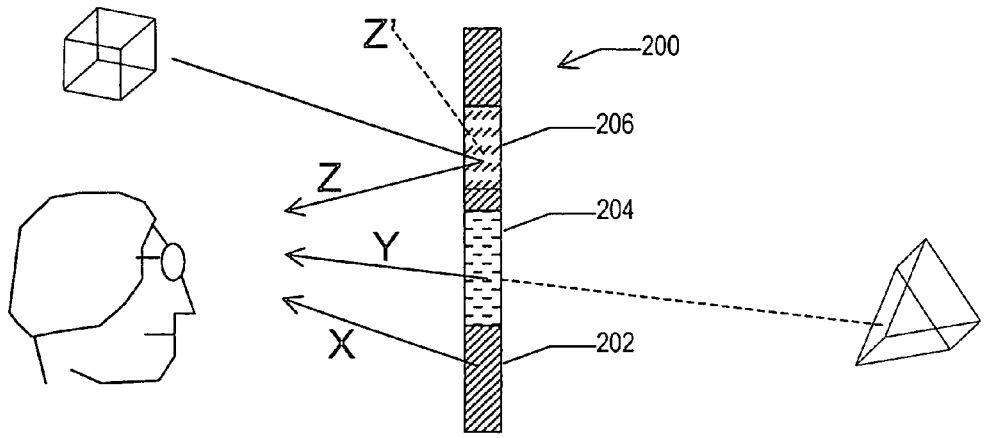
FIG. 2 illustrates the actual or apparent function of the display apparatus of FIG. 1.

FIG. 2 illustrates the desired effect of the novel display apparatus, using the stored codes just mentioned. The desired effect will be presented as a real effect, it being understood from later description that, in today's technology, the effect will in practice will be simulated by digital techniques using conventional display devices such as a Cathode Ray Tube (CRT) or a Liquid Crystal Display (LCD). From the perspective of the user, however, FIG. 2 illustrates the desired effect. A section through the display screen is represented schematically at 200. Light rays X, Y and Z reach the eye of the user from parts 202, 204, and 206 of the screen respectively. At 202, the screen is opaque, having a desired coloured image or pattern as in a conventional video display. In region 204, the stored image is defined to be transparent, such that a triangular object "behind" the screen 200 can be seen unobstructed by the present image. It will be understood by the skilled reader that this "background" image is typically another plane of the two-dimensional display, although in principle a physically transparent display screen 200 is not impossible. The colour of the screen at region 202 is represented by the RGB colour co-ordinates in conventional fashion. The transparency of the image at portion 204 is indicated, also in conventional fashion, by the value of transparency code T.

In accordance with the novel features of the present apparatus, as defined in the introduction, mirror code M stored for each part of the image indicates that an image contains parts which are to behave as if they were a perfect mirror. Accordingly, at part 206 of the image on screen 200, the user receives ray Z, emanating from the cuboid object, which is physically in the user's environment. The path of ray Z is shown in solid form as it would appear if the mirror surface were parallel with screen 200. Of course, if the mirror surface were angled relative to the screen, path Z' might be followed and some other part of the environment would be visible, "reflected" in the screen in part 206. It will be appreciated, that, were a user to move her head upwards in FIG. 2, her own face would be seen reflected in portion 206 of the image.

Figures 3A, 3B:
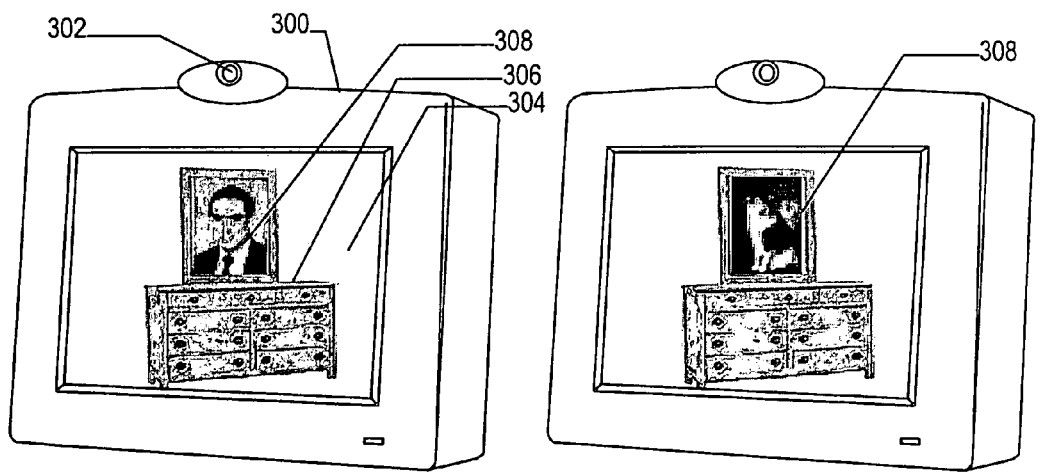
FIGS. 3A and 3B illustrate the operation of the display apparatus in a practical embodiment of the invention.

FIG. 3A and FIG. 3B illustrate the effect of this new code in a new embodiment based around a CRT or LCD display screen 300. A digital camera 302 of conventional design is incorporated, forward-looking, in the housing of the screen. Within the image displayed by screen 300 portion 304 is "transparent", showing a background image, such as the Microsoft Windows (TM) desktop. Portion 306 is an "opaque" representation of an item of furniture, the item of furniture including a representation of a mirror 308. A rearward-facing camera 310 might also be provided, for a "virtual transparency" effect, as will be described below, with reference to FIGS. 5 and 6.

FIG. 3A and FIG. 3B illustrate the change in the appearance of the image, when the physical environment changes, out in front of display screen 300. That is to say, a human user is visible reflected in mirror 308 in FIG. 3A. At a later time, a second "user" sits in front of the screen 300, giving a changed appearance of the mirror portion 308 as shown in FIG. 3B.

The present invention does not exclude the possibility of a device (screen 300) of a type which can physically render mirror surfaces by generating a partial or near-perfect silver-like surface when a pixel of the image contains non-zero mirror code M. It is more likely in practice, however, that the mirror component of the image will have to be supplied electronically, and the integrated forward-looking camera 302 can serve as the source of such information, as will be seen in the more detailed examples below. Needless to say, the same camera will likely serve as an input device in videoconferencing and other applications, besides the mirror effect.

Similarly, there exists the possibility of the source of background image being derived by physical transparency of the display device or by the use of a rearward-looking camera 310 to derive a representation of the background scene electronically.

Mirror co-ordinate M can be used in combination with other colour or transparency co-ordinates. For example, an (R,G,B,T,M) co-ordinate of (200,0,0,128,128) on a scale from 0–255 per co-ordinate could have the following properties as seen by the user:

A powerful red colour
    to which is added 50% of the colour of the underlying object (T=½)
    to which is added 50% of what a mirror would show at this pixel (M=½)

All the above is then normalised to account for potential excess of value 255 in the addition.

If the mirror co-ordinate is not set to full strength, the image is rendered as a dimmer mirror image. In an optional feature, one bit of the Mirror coordinate M can be used to indicate whether a conventional mirror image is required, or an image "as seen by other people" where the left-right inversion is corrected. This option could alternatively be set globally for the entire image frame.

Figure 4:
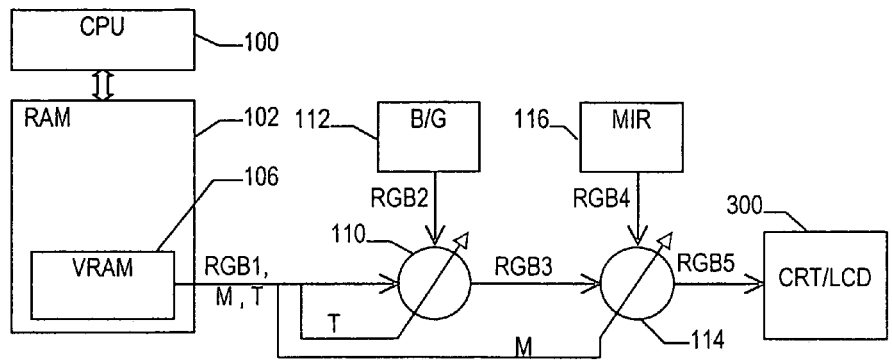
FIG. 4 illustrates schematically the functioning of the apparatus in a first, generalised embodiment.

FIG. 4 illustrates schematically the operation of a generalised electronic implementation of the mirror functionality described above. Throughout FIGS. 1 and 2 to 6 similar components are given the same reference numerals, for ease of comparison. These include in particular CPU 100, memory 102 (incorporating image memory 106) and the CRT, LCD or other physical display device 300. The R,G,B components of the image stored in image memory in 106 are supplied as signals RGB1 to a mixer 110, which is controlled by the T component of the stored image. A source 112 of background image data provides signals RGB2, which are mixed in accordance with value T, to yield a combined value RGB3, incorporating colour and transparency effects. Image source 112 may comprise a live video feed, a stored image, pattern or single colour value, as desired.

A further mixer 114 is provided, which is controlled by the mirror coordinate M on a per-pixel basis. A source 116 of mirror data is provided, the mirror image RGB4 being combined with image data RGB3 to yield final data RGB5, which is fed to the display device 300. Referring again to FIGS. 3A and FIGS. 3B, the value of RGB4 for each pixel depends on the environment in front of the display device 300 at a given time, although of course this effect cannot be represented faithfully in a patent drawing.

Figure 5:
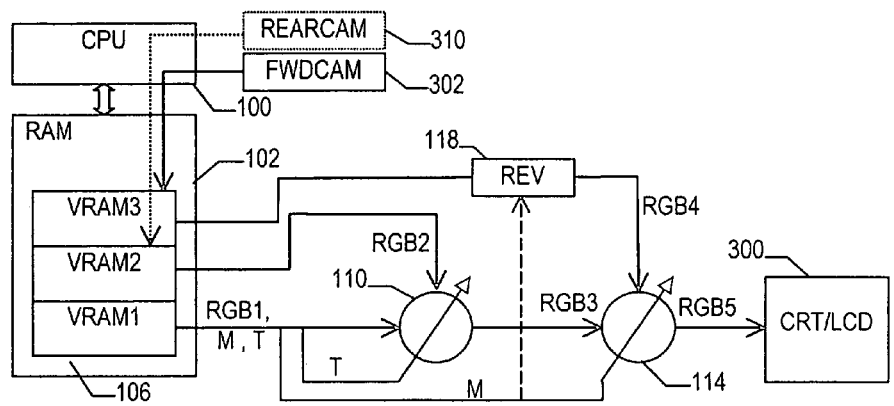
FIG. 5 illustrates the structure and functioning of the apparatus in a second specific embodiment implemented using a conventional desk top PC.
Figure 6:
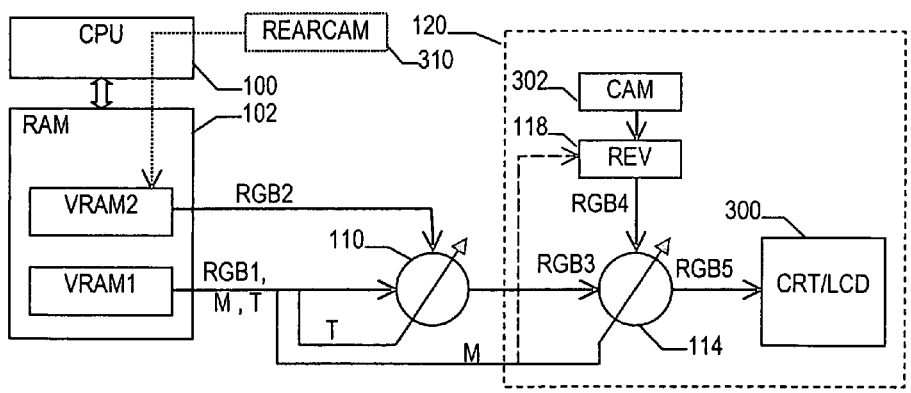

FIG. 5 and FIG. 6 illustrate two specific embodiments of the system of FIG. 4, according to which forward-looking digital camera 302 is used to derive a mirror image data RGB4. Only points of difference relative to FIG. 4 will be described.

In the embodiment of FIG. 5, a constant supply of environmental image data is provided by forward-looking camera 302. Under control of CPU 100, these images are stored in a separate area of image memory 106, labelled VRAM3. Similarly, the background image data (RGB2) are stored in an area labelled VRAM2. Data RGB2 are provided directly to mixing element 110 to define the background visible through transparent parts of the foreground image stored at VRAM1. The data from region VRAM3 are read via a reversing process 118, to yield the mirror image signal RGB4 which is provided to mixing element 114, for selective combination with RGB3 to yield final data RGB5 which is fed to the display device 300. It will be appreciated that the reversal process can be switched on and off by a bit of component M, or some other control field, as mentioned before, and this is illustrated by the dotted arrow leading from line M to reversing process 118.

Although it is illustrated as a separate component, the skilled person will appreciate that reversing process 118 can be implemented in a variety of ways, either explicitly or implicitly. Typically an image will be reversed by modifying the sequence of read-out from memory VRAM3. Alternatively, the sequence in which the image data are stored could be reversed prior to storage, upon input from the forward-looking camera 302. Further, a separate reversal process could be performed on the data stored at VRAM3, prior to display.

A modification of this apparatus is illustrated in broken lines, which provides a "virtual transparency" function, in addition to the virtual mirror function already described. In this modification a rearward-looking camera 310 is provided to supply image data representing the real environment behind the display screen. This is stored in area VRAM2 as the source of data RGB2, to be used in accordance with the transparency coordinate T.

Referring to FIG. 6, a forward-looking camera 302 and reversal function 118 are integrated within a display monitor unit 120. In this embodiment, processing required by the CPU and the main body of the computer system is reduced, in that the forward-looking camera data are processed directly by the display apparatus, rather than processed via the CPU. As in FIG. 5, the background image data (RGB2) as stored in the image memory labelled VRAM2, can be derived from the CPU or optionally the rearward-looking camera 310 (shown in broken lines).

In a further modification the rearward-looking camera 310 can also be integrated within a display monitor unit 120. In that case processing required by the CPU and the main body of the computer system is further reduced, in that all camera data are processed directly by the display apparatus, rather than processed via the CPU.

Although the implementations of FIG. 5 and FIG. 6 are different in terms of the hardware and software providing the component functions, it will be appreciated that, at the application level, the user and programmer of the system need not be aware of the physical implementation, whether by CRT, integrated display monitor or by some physically reflective display device of a type not yet invented. Rather, a driver program resident in memory 102 will be informed of the location of the image data RGB, M, T, in image memory 106, and will then interface appropriately to whatever hardware is provided, and provide appropriate functionality (e.g. mixing elements 110, 114) in software, if suitable hardware is not present. The details of such implementations will not be described herein, as they are well within the capability of the skilled person. The types of hardware and processing required are well represented in the various patent references cited in the introduction, and in text books such as "Principles of Computer Graphics", Second Edition, by Foley, van Dam, Feiner and Hughes, published by Addison Wesley, ISBN 0-201-12110-7 (see pages 8 to 17 for example). Various objects and/or modifications of the system will now be described.

It will be understood that the applications generating the image data may be unaware whether the display device in use actually provides the mirror functionality. If no information is available to render the mirror, then a silvery colour/texture could be rendered, as an approximation, using the normal range of RGB-synthesised colours.

As mentioned above in relation to ray Z' in FIG. 2, an option may be provided to provide a real or simulated mirror, oriented differently from the plane of the display screen itself. In addition to the strength of the reflection, represented by co-ordinate M, the azimuth and altitude values for the simulated mirror surface may also be stored as part of the image, representing left-right tilt and up-down tilt respectively. A shimmering effect, or a moving mirror effect, can be provided by varying these components for successive frames of a motion picture sequence. These effects can be provided by lookup table animation just as colour variations are provided in known systems. As for the mirror components, the transparency code T may be expanded to allow variation of the direction of view "through" the screen. This might provide refraction effects, for example.

Clearly the image source 116 for the mirror image at each pixel needs to be aware and capable of generating the correct values RGB4 according to the orientation of the simulated mirror. In a simple implementation, using a single forward-looking video camera 302 as the source of the mirror image data, a geometric transformation can be defined to select which part of the camera image field should be represented at a given point on the display screen. It is a matter of design choice whether this transformation takes into account perspective, distortions and so forth, or whether a cruder approximation to the exact mirror image is sufficient.

In a more complex implementation of mirrors having different orientations, multi-camera (e.g. stereoscopic) feeds can be input, and processed to obtain 3-dimensional images of the environment, allowing a more accurate view to be presented from each point on the display screen. Similarly, as the image from a real mirror depends on the position of the person viewing it, heightened realism may be provided by detecting and compensating for movement in the actual position of the viewer in front of the screen. Equally, 360-degree environment images may be obtained by only two cameras 301, 310, each having a "fisheye" lens.

In addition to the above enhanced functionality, it will be appreciated that the forward-looking camera 302 even in previous systems is placed from the nominal position of the mirror surface, somewhere on the screen 300 and a perspective transformation may be implemented in reading the mirror image data RGB4, in order to give a more realistic viewpoint, as if from a given point on the screen. Again, a range of transformation techniques are possible depending on the desired trade-off between realism, cost and quality as are known for texture mapping, for example. The same level of image transformation would be possible for the rearward-looking camera image.

There is often a desire to provide hard copy of images viewed on a display terminal. A printer having the ability to deposit mirror-like material on paper or other media can be envisaged, which will exploit the mirror codes M appropriately. A printer not having such a capability can make its best attempt at a silvery effect using normal colour inks, just as described above with display devices not enabled with mirrored functionality.

Advantages of the mirror function include:
Enhanced and/or more realistic image capabilities allow novel:
Applications in internet browsing
Applications in images in documents
"Flashy" (in the literal and figurative sense), shiny icons reflecting incident light
Images interact with the user and the user's environment, providing an element of personalization
Provides an easy means for terminals to implement a vanity mirror application (just display an image consisting of mirror pixels only).
A left-right inversion correction facility provides a means to see oneself "as seen by other people", all in the encoding of an image.

Those skilled in the art will appreciate that the embodiments described above are presented by way of example only, and that many further modifications and variations are possible within the spirit and scope of the invention.

The invention claimed is:

1. A display apparatus comprising a display device and means for storing an image in the form of digital data, the digital image data being stored in a format defining color values and a mirror code comprising additional mirror and transparency values for different parts of the stored image, and means for controlling the display device so as to display reflections of the real environment selectively according to the mirror value at each part of the stored image and to display portions of the real environment selectively according to the transparency value at each part of the stored image.

2. An apparatus as claimed in claim 1 wherein rendering of said reflections is by physical rendering of a silver-like effect, under control of said mirror values.

3. An apparatus as claimed in claim 1 wherein said reflections are rendered by merging colors defined by said color values with information received in real time from a camera associated with the display device.

4. An apparatus as claimed in claim 3 wherein said merging is implemented to a variable degree, in accordance with a range of possible mirror values stored within said image data format.

5. An apparatus as claimed in claim 3 wherein a part of the range of said mirror values is reserved to indicate normal mirror rendering or left-right inversion corrected rendering, and the reflections rendered accordingly.

6. A display apparatus comprising:
a display device, and
means for storing an image in the form of digital data, the digital image data being stored in a format defining color values and additionally mirror values for different parts of the stored image, and means for controlling the display device so as to display reflections of the real environment selectively according to the mirror value at each part of the stored image;
wherein said reflections are rendered by merging colors defined by said color values with information received in real time from a camera associated with the display device; and
wherein said controlling means is arranged to apply geometric transformations on the image data derived from the camera, in addition to left-right inversion, to correct for displacement of the camera relative to the notional reflective point on a screen of the display device.

7. An apparatus as claimed in claim 1 wherein said image data format further specifies a variable mirror orientation, said reflections being rendered so as to reflect a different part of the real environment, depending on the specified mirror orientation.

8. An apparatus as claimed in claim 7 wherein the mirror orientation is specified in the form of two angles with respect to the plane of the display.

9. An apparatus as claimed in claim 1 wherein said color values, mirror and transparency values are stored for each pixel or group of pixels within a raster-based image.

10. An apparatus as claimed in claim 1, further comprising:
an image storage device wherein there is stored the image data.

11. An apparatus as claimed in claim 1, further comprising:
a hard copy printing device arranged to deposit colored and mirror-like materials onto a recording medium selectively according to the color and mirror values at each part of the stored image.

12. An apparatus as claimed in claim 1 wherein rendering of said portions is by physical transparency, under control of said transparency values.

13. An apparatus as claimed in claim 1 wherein said portions are rendered by merging colors defined by said color values with information received in real time from a camera associated with the display device.

* * * * *